United States Patent [19]

Heijwegen et al.

[11] 4,376,043
[45] Mar. 8, 1983

[54] PROCESS OF TREATING DUST CONTAINING ZINC AND LEAD AND DERIVED IN AN IRON OR STEEL MAKING PROCESS

[75] Inventors: Cornelis P. Heijwegen; Willem Kat, both of Ijmuiden, Netherlands

[73] Assignee: Estel Hoogovens B.V., Ijmuiden, Netherlands

[21] Appl. No.: 262,690

[22] Filed: May 11, 1981

[30] Foreign Application Priority Data

May 13, 1981 [NL] Netherlands .................... 8002743

[51] Int. Cl.³ ............................................. B03D 1/14
[52] U.S. Cl. .................................. 209/167; 209/2; 209/166; 75/25; 210/703; 55/84
[58] Field of Search ............... 209/167, 2, 10; 55/72; 75/25; 423/94, 98, 103

[56] References Cited

U.S. PATENT DOCUMENTS

| | | | |
|---|---|---|---|
| 1,254,173 | 1/1918 | Terry | 209/167 |
| 1,668,202 | 5/1928 | Griswold | 209/167 |
| 1,984,386 | 12/1934 | Tschody | 209/167 |
| 2,611,485 | 9/1952 | Tseter | 209/167 |
| 3,375,069 | 3/1968 | Duval | 423/103 X |
| 3,770,213 | 11/1973 | Lynn | 209/166 |
| 3,998,628 | 12/1976 | Gandor | 423/98 X |
| 4,166,737 | 9/1979 | DeMarthe | 423/98 |
| 4,191,729 | 3/1980 | Rinelli | 423/98 |
| 4,213,942 | 7/1980 | Thornton | 423/98 X |
| 4,250,027 | 2/1981 | Cases | 209/2 X |

FOREIGN PATENT DOCUMENTS

| | | | |
|---|---|---|---|
| 2603096 | 1/1976 | Fed. Rep. of Germany | 75/25 |
| 2914013 | 12/1976 | Fed. Rep. of Germany | 75/25 |
| 49-55502 | 10/1972 | Japan | 209/167 |
| 55-14825 | 2/1980 | Japan | 75/25 |
| 16302 | of 1914 | United Kingdom | 209/167 |

*Primary Examiner*—Norman Yudkoff
*Attorney, Agent, or Firm*—Stevens, Davis, Miller & Mosher

[57] ABSTRACT

Zinc and lead are separated together out of dust derived from a gas-cleaning installation in iron or steel making by a flotation-separation treatment. In order economically to provide a good separation of these metals and to leave a residue which is re-usable in an ore-preparation process in the iron and steel industry, the flotation-separation treatment is at a pH of 7 to 9 and is effective to achieve a separation, according to size of the dust particles, of a floated component in which the zinc and lead are concentrated and a non-floated component which is suitable for re-use.

2 Claims, 3 Drawing Figures

PROCESS OF TREATING DUST CONTAINING ZINC AND LEAD AND DERIVED IN AN IRON OR STEEL MAKING PROCESS

BACKGROUND OF THE INVENTION

1. Field of the Invention

The present invention relates to a process for treating dust containing zinc and lead derived from a gas-cleaning installation in an iron or steel making process. In particular the treatment process involves a flotation separation treatment.

2. Description of the Prior Art

A process of this general type is already known, for example from Dutch Published Patent application No. 76 00876 (JA published applications Nos. 51-125603 and 52-066805, DE No. 2 603 096). This represents one of many attempts to separate all the zinc and lead individually by means of flotation in a flotation process. To date, such attempts have hitherto always failed, and for this reason the use of flotation processes for treating this type of waste gas dust has remained unsuccessful. In practice, where the zinc and lead-bearing dust is processed, this is achieved mainly by a thermal treatment in which the zinc and lead are removed selectively from the dust. The direct separation of zinc and lead from the dust-bearing gas by leaching has also been suggested.

Thermal processing of the dust entails considerable investment and high running costs, primarily energy costs. For this reason, physical/chemical processing methods, which can be considerably cheaper than thermal processes are currently being sought.

It has also been suggested that a hydrocyclone treatment is used to separate a zinc and lead rich fraction and a fraction containing little zinc and lead. However, this method also entails high investment costs and is in addition susceptible to malfunctioning.

SUMMARY OF THE INVENTION

It has been found that between 5 and 20% of the dust in blast furnace gas consists of particles which are smaller than 0.02 mm, and that these small particles are relatively rich in zinc and lead compounds. 70 to 90% by weight of the total quantity of zinc and lead is to be found in this fine fraction, the zinc and lead apparently being present mainly in the form of oxide compounds.

In an LD steelmaking process, it appears that zinc and lead are released mainly during the charging and inversion of the steel converter. The dust collected during the charging and inversion of the converter (so-called secondary dust), by a secondary exhaust installation, contains a high proportion of between 10 and 20% of zinc and lead. Again, a 15 to 30% fraction of this dust has a particle size of less than 0.02 mm and this fraction contains about 70 to 90% of the total quantities of zinc and lead which are likewise present mainly in the form of oxide compounds.

The primary object of the present invention is to produce a residue from treatment of such dusts, which residue contains small quantities of zinc and lead and is re-usable in an iron and steel-making process.

Another object of the present invention is to provide a process for treatment of the dust so that the zinc and lead become sufficiently concentrated that they can usefully be separated.

The invention as claimed is intended to provide a solution. The advantage of the invention is that the dust can undergo a flotation treatment which is non-selective in respect of the components of the dust. Any dust which is not collected in the layer of froth is then returned, after filtration, to an ore preparation process prior to being fed into a reduction furnace. Filtration can be performed, for example, by means of a vacuum filter or a filter press.

Good results can be obtained especially if a frother during the flotation separation process is selected from the group which comprises short-chain alcohol polyglycol ethers, branched hexanols and branched decanols, preferably 0.1 to 1.0 kg of frother being used per tonne of dry matter.

The present process differs significantly from earlier methods using a flotation treatment in that it no longer tries to achieve separation of the zinc and lead in the layer of froth during the flotation treatment by adding separating agents and in that the flotation process is not performed in such a way as to remove all the zinc and lead. Instead of this, a suitable separation process is now used (e.g. a suitable frother is selected) to achieve separation between a zinc and lead rich fraction in the floated layer and a non.floated fraction containing small quantities of zinc and lead. This separation between poor and rich fractions is achieved because the vast majority of the lead and zinc is present in the dust particles of size less than 0.02 mm. In performing this separation, the aim is to keep the amount of zinc and lead in the non-floated fraction sufficiently low to ensure that it can be used without difficulty in an ore preparation process, for example in a blast furnace. A suitable ore preparation process which can be considered by way of an example is the addition of this fraction to powdered ore material which is then sintered on a sintering grate.

In this way, it is possible to ensure that the material returned to e.g. the blast furnace contains such small quantities of zinc and lead that concentration of these metals in a blast furnace does not occur, thus preventing the formation of deposits in the blast furnace which can attack the refractory lining and interrupt the operation of the furnace. Moreover, the amount of zinc and lead in the pig iron tapped from the furnace can be kept so low that virtually none of the zinc vapour which can cause unacceptable working conditions during tapping are released during tapping.

Moreover, the introduction into the blast furnace of a considerable proportion of the dust derived from the gas represents a saving in iron management, so that more iron and steel can be produced from an ore, whilst at the same time there are no longer problems associated with the disposal of the dust in the gas.

If the dust from the gas contains an extra high quantity of zinc and/or lead, it is also possible in the present invention to achieve further concentration of the zinc and lead by subjecting the floated layer produced by the flotation separation treatment to one or more further flotation separation treatments of a similar kind. By returning to the feed to the first flotation separation treatment the non-floated material of this subsequent treatment or treatments, further enrichment of the floated components with zinc and lead can occur.

It has been found that the floated component of the or each flotation separation process contain considerable quantities of iron compounds and carbon. It is advantageous also to separate these materials from the zinc and lead and return them to the iron or steel making process. This is particularly true in the case of carbon, which has a strong tendency to collect in the floated layers. Since carbon is of use as a source of energy in the sintering process and/or in the blast furnace, it is advisable for this reason also to separate the zinc and lead compounds on the one hand and the remaining components of the dust on the other. This separation is preferably done by leaching out these components from the final floated component collected, under conditions such that at least 90% of the zinc and lead compounds present dissolve, so that the residual solid phase can be returned e.g. to the ore preparation process, also after filtration. As a rule, leaching takes between 10 and 40 minutes. Preferably HCL, e.g. 1 N HCL is used as a leaching agent.

In this leaching process, good results are obtained with the bath at a temperature of 20° to 80° C., preferably about 50° C.

It is possible for the solution of zinc and lead in HCL to be supplied as such to a refining organisation for separation of the lead and zinc. However, it appears that this separation process can very easily be included after the flotation treatment, for example by recovering zinc and lead from the solution by means of a conventional solvent extraction method. However, it is alternatively possible to raise the acidity of the solution carefully in order to recover zinc and lead from it.

It has been found that the process of the invention is less suited to the treatment of the primary LD dust which is released during blowing of a steel converter. This is related to the small particle size of the LD dust, which means that effective separation of a zinc and lead-rich fraction and a zinc and lead-poor fraction cannot be achieved by flotation treatment. However, the process of the invention appears eminently suitable for applications involving gas dust emanating from a blast furnace and/or from the secondary gas cleaning installation in a LD steel plant. In this respect it should be noted that reference here to an LD process includes reference to other steelmaking processes where oxygen is blown across or through the bath, such as the LD-AC and OBM processes, which are known from the existing literature, and to variations thereof.

In the flotation separation process especially good results are obtainable if the bath has a dust concentration of 20 to 40% by weight. An air volume of 2 to 6 liters per minute per liter of liquid is preferably passed into the bath and preferably also the process lasts between 15 and 30 minutes at a temperature of 5° to 50° C., more preferably 15° to 30° C. In general an agitator has to be used in order to keep the liquid of the bath in motion and to distribute air throughout the fluid. The shape of this agitator is dependent on the shape and dimensions of the flotation tank. If the capacity of the tank is between 1 and 10 m$^3$, good results are obtained with an agitator turning at about 800 to 1,500 r.p.m. This preferred speed of rotation is virtually unaffected by the dimensions of the flotation tank, but it should be sufficient to introduce the correct quantity of air and to set the liquid completely in motion.

BRIEF INTRODUCTION OF THE DRAWINGS

Preferred embodiments of the invention will now be described by way of non-limitative example with reference to the accompanying drawings. Examples of the invention are also given. In the drawings.

In the Figures, the same elements and functions have the same reference numbers.

Figure 1:
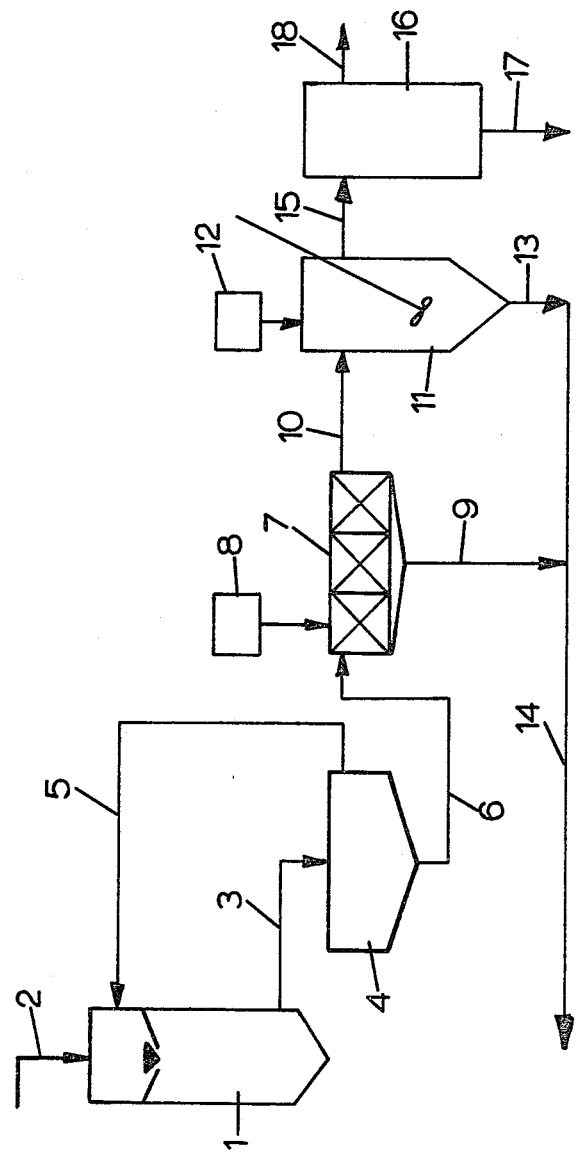
FIG. 1 shows diagrammatically an embodiment of the process of the invention.
Figure 2:
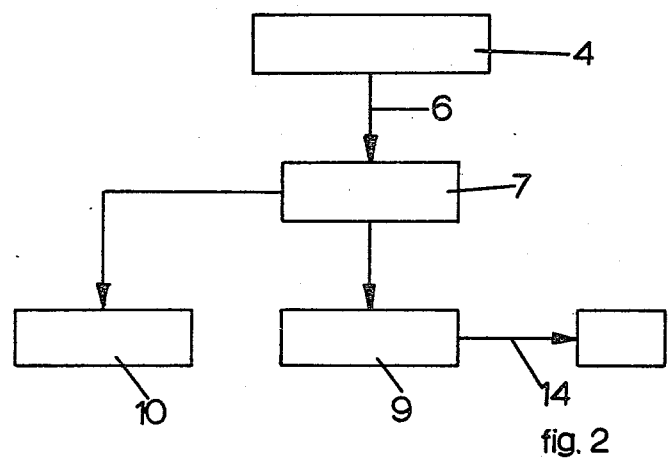
FIG. 2 shows the process of FIG. 1 as a block diagram.

In FIGS. 1 and 2, there is indicated a variable capacity gas scrubber 1 of conventional construction. Process gas emanating from an iron or steel-making process is introduced into the gas scrubber at 2. The scrubbing water and dust collected by the scrubber 1 is delivered via a pipe 3 to a settling tank 4. The settling tank 4 is also of conventional construction. The scrubbing water which is largely free of dust after settling is recycled via a pipe 5, whilst the sediment is fed to a flotation apparatus 7, via a pipe 6.

The flotation apparatus 7 may consist of a number of cells arranged in sequence and each having roughly a cube shape. A frother (as described above) is introduced into the flotation apparatus from a supply tank 8. Agitation is carried out as described above. This flotation separation process permits a floated layer of froth 10 which is rich in zinc and lead oxides to be removed from the top of the flotation tank, whilst a sedimented mass of dust containing small quantities of zinc and lead can be discharged from the bottom of the flotation tank via a pipe 9.

The layer of froth is then delivered via a pipe 10 to a tank 11, where it is leached out with hydrochloric acid, which is supplied from a tank 12. The zinc and lead compounds dissolve completely and the residue is discharged from the bottom of the tank 11 via a pipe 13. The products discharged through the pipes 9 and 13 are collected in a pipe 14 and are then supplied to a sintering grate for preparation of sintered material to be supplied to a blast furnace.

The solution discharged from the tank 11 is delivered via a pipe 15 to a reactor 16 in which zinc and lead are separated as solids and discharged via pipe 17, this separation being achieved either by means of solvent extraction, or by carefully raising the alkalinity by adding lime milk. The residual solution, which is essentially free of zinc and lead can then be discharged via a pipe 18 into a drain system since it now contains virtually no materials which will be harmful in surface water.

EXAMPLE 1

Using the apparatus and process illustrated, blast furnace gas dust with the following composition is scrubbed and treated:

| | |
|---|---|
| Zn | 0.57% |
| Pb | 0.06% |
| Fe | 34% |
| C | 33% |

The process conditions are as follows:
frother: a short-chain alcohol polyglycol ether of a type commonly used as a commercial frother
pH of flotation bath: 8
flotation bath temperature: 20° C.
flotation tank capacity: 5 m$^3$
speed of agitator in flotation tank: 1,500 r.p.m.
quantity of air introduced into the bath per minute: 4 liters/liter of liquid
flotation time: 16 minutes
concentration of dust in the bath: 30%

The following is the analysis of the solids in the froth layer and the non-floated residue:

|  | % Zn | % Pb | % Fe | % C |
| --- | --- | --- | --- | --- |
| Froth layer | 1.9 | 0.25 | 8.6 | 69 |
| Residue | 0.2 | 0.03 | 45.1 | 19 |

Expressed as a flotation yield, which is defined as:

$$\text{Flotation yield} = \frac{\text{(quantity of material in froth layer)}}{\text{(initial quantity of material)}} \times 100\%$$

this means:

|  | Total dust | Zn | Pb | Fe | C |
| --- | --- | --- | --- | --- | --- |
| Flotation yield | 24% | 76% | 73% | 6% | 54% |

From these results, it can be seen that a very considerable proportion of the zinc and lead but only a small quantity of the iron present, is separated from the dust. Because of this, the non-floated residue from the flotation process is, after filtration, ready to be delivered to a sintering grate.

During the leaching process which is performed with 1 N HCL in tank 11 at 50° C. for 30 minutes, more than 90% of the zinc and lead present in the floated layer dissolves, whilst only 5 to 15% of the iron dissolves. The undissolved residue is thus rich in iron and carbon and is thus suitable for supply to a sintering grate after filtration. This leaching process can be performed either continuously or in batches.

Figure 3:
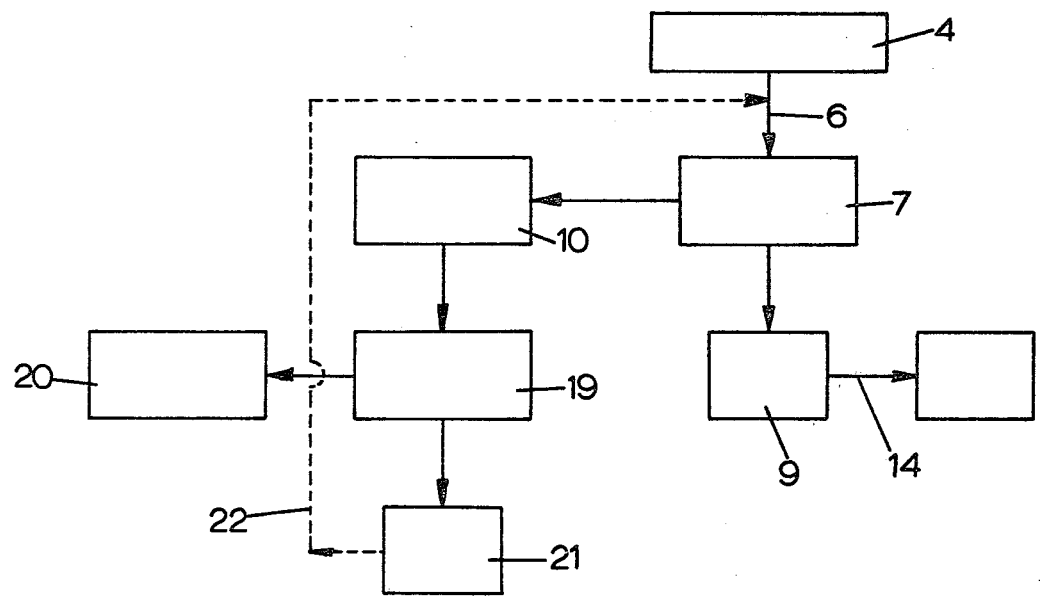
FIG. 3 is the block diagram of a modification of the process of FIGS. 1 and 2.

FIG. 3 shows an alternative process. Reference numbers 4,6,7,10,9 and 14 refer to the same elements or functions as in FIGS. 1 and 2.

In this process, the separated layer of froth 10 is delivered to a second flotation separation stage, where once again a floated layer 20 is separated from a non-floated residue 21. This second flotation separation is carried out substantially similarly to the first, as described below. The residue 21 is not fed directly to a sintering grate but is first returned to the first flotation stage 7, as a result of which the non-floated residue of the first stage 7 is enriched with iron and carbon and is thus more suitable for return to the sintering grate.

EXAMPLE 2

In a process and apparatus as indicated in FIG. 3, blast furnace gas dust is delivered to the gas scrubber. The composition of this dust is as follows:

| Zn | 0.56% |
| --- | --- |
| Pb | 0.23% |
| Fe | 46.9% |
| C | 24.8% |

Flotation is performed in two stages as described in both stages, short-chain alcohol polyglycol ether being used as the frother, whilst the pH and the temperature of the bath in each stage are pH 8 and 20° C. Similarly, in both cases, the quantity of air introduced per minute is 4 liters per liter of liquid. However, whilst in the first stage the concentration of dust in the liquid is 35 wt.% and the flotation time is 20 minutes, in the second stage these values are 20% and 25 minutes respectively.

The composition of the gas dust in the floated layer of the second stage and the composition of the nonfloated residual dust in the first stage are analysed as in Example 1, and the flotation yield determined.

| Analysis: | % Zn | % Pb | % Fe | % C |
| --- | --- | --- | --- | --- |
| 2nd stage floated layer | 2.4 | 0.53 | 10 | 65 |
| 1st stage residue | 0.13 | 0.02 | 45 | 9 |

Flotation yield =

$$\frac{\text{(quantity of material in 2nd stage floated layer)}}{\text{(initial quantity of material)}} \times 100\%$$

|  | Total dust | Zn | Pb | Fe | C |
| --- | --- | --- | --- | --- | --- |
| Flotation yield | 20% | 80% | 80% | 5% | 60% |

From these results, it is clear that the flotation yield is better in this Example for zinc and lead, and for carbon, but not for iron. The residue from the first flotation stage is thus more suitable for reintroduction to a sintering grate, whilst further treatment of the second layer of froth produces a richer solution of zinc and lead.

Subsequent treatment of the second layer of froth is exactly the same as in this Example as in Example 1.

In conclusion, the method of the invention has the following advantages over the previously known processing methods:
relatively low investment cost
low running costs
a simple system.

This is achieved mainly by using a non-selective flotation technique in which a suitably chosen frother is employed.

What is claimed is:

1. A process of treating dust containing zinc and lead oxides of size less than 0.02 mm and derived from a gas cleaning installation in an iron or steel-making process, comprising the steps of
   (i) subjecting said dust to a flotation separation treatment in a bath of pH in the range 7 to 9 containing a frother selected from the group consisting of short chain alcohol polyglycol ethers, branched hexanols and branched decanols such that the dust is separated according to dust particle size into a floated component in which the zinc and lead are concentrated and non-floated component,
   (ii) feeding said non-floated component to an ore-preparation process for a reduction furnace,
   (iii) treating said floated component with HCl to dissolve at least 90% of the zinc and lead components present,
   (iv) separating residual solid material from said dissolved components and
   (v) feeding said residual solid material to said ore preparation process.

2. A process according to claim 1 wherein an amount in the range of 0.1 to 1.0 kg of frother are used per ton of dust.

* * * * *

UNITED STATES PATENT AND TRADEMARK OFFICE
CERTIFICATE OF CORRECTION

PATENT NO. : 4,376,043

DATED : March 8, 1983

INVENTOR(S) : HEIJWEGEN et al.

It is certified that error appears in the above—identified patent and that said Letters Patent is hereby corrected as shown below:

Title page, under "Foreign Application Priority Data", change "May 13, 1981" to --May 13, 1980--.

Signed and Sealed this

Twenty-eighth Day of June 1983

[SEAL]

Attest:

GERALD J. MOSSINGHOFF

Attesting Officer — Commissioner of Patents and Trademarks